(12) United States Patent
Abylov et al.

(10) Patent No.: US 8,642,104 B2
(45) Date of Patent: Feb. 4, 2014

(54) METHOD FOR PRODUCING A CONFECTIONERY PRODUCT

(75) Inventors: Melis Abylov, Munich (DE); Dieter Stephan Simbuerger, Munich (DE); Juraj Durco, Zalesie (SI)

(73) Assignee: Kraft Foods R&D, Inc., Deerfield, IL (US)

( * ) Notice: Subject to any disclaimer, the term of this patent is extended or adjusted under 35 U.S.C. 154(b) by 325 days.

(21) Appl. No.: 12/176,571

(22) Filed: Jul. 21, 2008

(65) Prior Publication Data

US 2009/0022866 A1    Jan. 22, 2009

(30) Foreign Application Priority Data

Jul. 20, 2007    (EP) ..................................... 07014289

(51) Int. Cl.
- *A23G 3/02* (2006.01)
- *A23G 3/20* (2006.01)
- *A23G 3/00* (2006.01)
- *A23B 4/02* (2006.01)

(52) U.S. Cl.
USPC ........... 426/517; 426/512; 426/103; 426/660; 99/494

(58) Field of Classification Search
USPC ................. 426/103, 389, 660, 104, 512, 517; 99/494
See application file for complete search history.

(56) References Cited

U.S. PATENT DOCUMENTS

| | | | |
|---|---|---|---|
| 2,082,313 A | 6/1937 | Todd | |
| 2,122,703 A | 7/1938 | Weinreich | |
| 2,425,431 A | 8/1947 | Vangie | |
| 2,650,551 A | 9/1953 | Eckels et al. | |
| 4,368,684 A | 1/1983 | Launay | |
| 4,384,678 A | 5/1983 | Bouette | |
| 4,542,028 A | 9/1985 | Butcher et al. | |
| 4,715,275 A * | 12/1987 | Getman | 99/494 |
| 5,000,969 A * | 3/1991 | Beer | 426/101 |
| 5,019,404 A | 5/1991 | Meisner | |
| 6,436,455 B2 * | 8/2002 | Zietlow et al. | 426/104 |
| 6,951,660 B2 | 10/2005 | Brown et al. | |
| 2002/0102333 A1 | 8/2002 | Klug et al. | |
| 2004/0170751 A1 | 9/2004 | Roy et al. | |
| 2004/0247761 A1 | 12/2004 | Zietlow et al. | |
| 2009/0020566 A1 | 1/2009 | Abylov et al. | |
| 2009/0285954 A1 * | 11/2009 | Simbuerger et al. | 426/470 |

FOREIGN PATENT DOCUMENTS

| | | | |
|---|---|---|---|
| DE | 3608623 A1 | 9/1987 | |
| DE | 60118932 T2 | 4/2007 | |
| EP | 0366978 A | 5/1990 | |
| EP | 0 494 384 A2 | 7/1992 | |

(Continued)

OTHER PUBLICATIONS

European Search Report dated Jan. 16, 2008; 2 pages.

(Continued)

*Primary Examiner* — Humera Sheikh
*Assistant Examiner* — Bhaskar Mukhopadhyay
(74) *Attorney, Agent, or Firm* — Fitch, Even, Tabin & Flannery LLP

(57) ABSTRACT

A method of producing a confectionery product includes the steps of:
- a) depositing at least one confectionery mass by allowing it to flow into a mold,
- b) depositing at least one particulate material in and/or on the confectionery mass; and
- c) repeating at least step a) at least once.

26 Claims, 1 Drawing Sheet

(56) References Cited

FOREIGN PATENT DOCUMENTS

| | | |
|---|---|---|
| EP | 0730826 A1 | 9/1996 |
| EP | 1171001 A1 | 1/2002 |
| EP | 1354519 A1 | 10/2003 |
| EP | 1673978 A1 | 6/2006 |
| GB | 18424 A | 0/1913 |
| GB | 166296 A | 7/1921 |
| GB | 376328 A | 6/1932 |
| GB | 666635 A | 2/1952 |
| GB | 1145854 A | 3/1969 |
| GB | 2164727 A | 3/1986 |
| GB | 2 283 699 A | 5/1995 |
| JP | 2000210028 A | 8/2000 |
| JP | 2002153212 A | 5/2002 |
| RU | 2140745 C1 | 11/1999 |
| RU | 2269899 C2 | 2/2006 |
| SU | 561315 | 6/1979 |
| WO | 03043437 A1 | 5/2003 |
| WO | 2004/056191 A1 | 7/2004 |

OTHER PUBLICATIONS

Examination Communication, European Patent Application No. 07 014 289.8, dated Aug. 6, 2010, 4 pages.

* cited by examiner

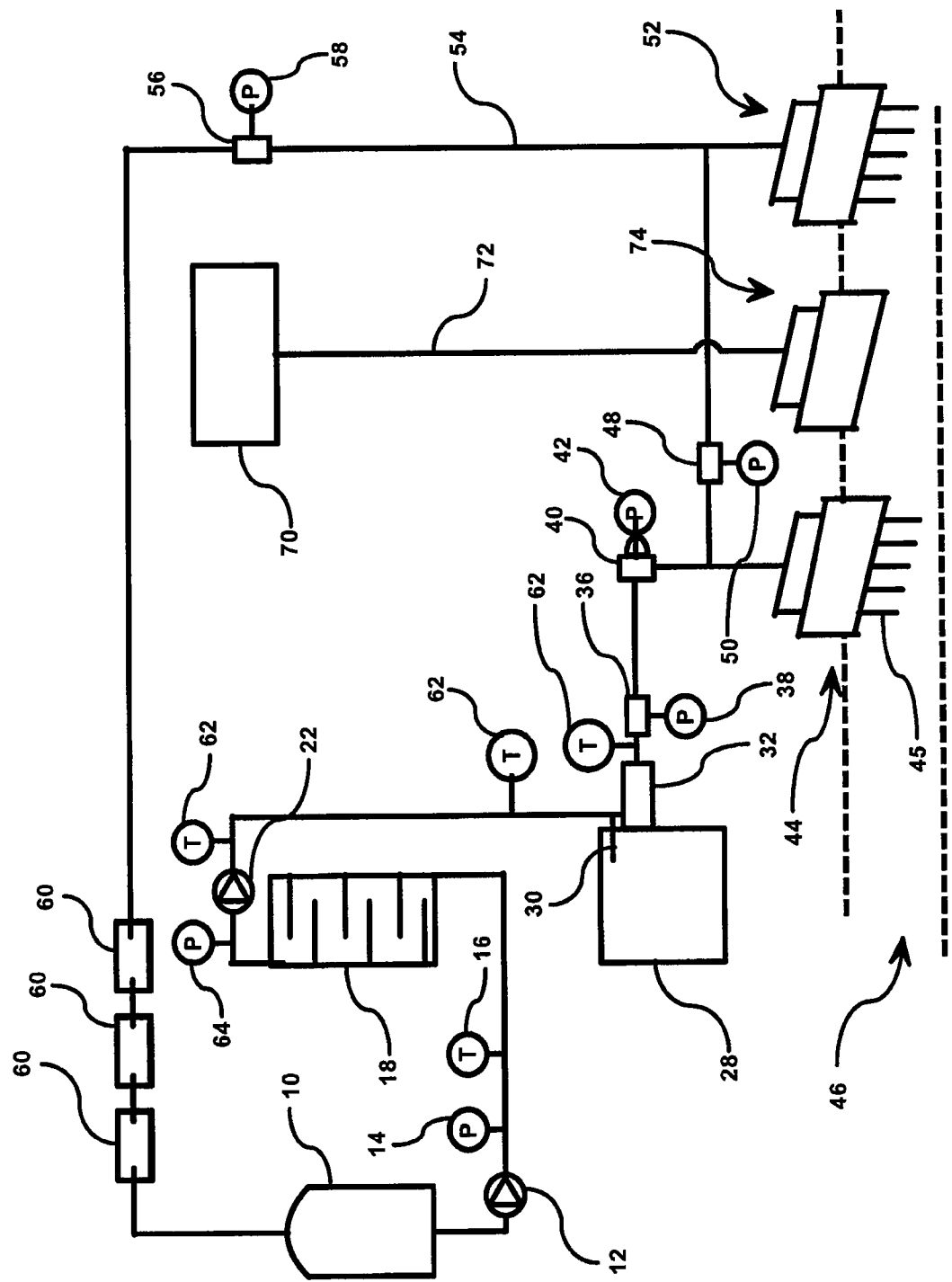

METHOD FOR PRODUCING A CONFECTIONERY PRODUCT

TECHNICAL FIELD

The invention relates to a method for producing a confectionery product. In particular, the invention is related to the production of a confectionery product including a fat-containing confectionery mass, including but not limited to aerated chocolate, and particulate inclusions.

In the field of producing confectionery products, such as chocolate tablets or bars, a confectionery mass (i.e., a chocolate mass) is deposited into molds. In this context, the confectionery mass may be mixed with particulate inclusions, such as nuts or pieces of nuts, and the mixed mass is deposited afterwards. Particularly when the confectionery mass is an aerated mass, the presence of particulate inclusions in the mass tends to rupture or break gas bubbles which leads to undesired deaeration.

U.S. Patent Publication 2004/0170751 A1 is related to a method which has the above-mentioned problem as an aerated mass having particulate material is extruded. Moreover, an apparatus for mixing of aerated mass with particulate material under super-atmospheric pressure is described.

U.S. Pat. No. 4,542,028 describes a process for producing a composite frozen confection product, in which extrudable foodstuff, which may be aerated, is extruded in thin layers. Particulate material, such as nuts, may be deposited as an intermediate filling or interlayer.

In some cases, a confectionery mass is deposited into molds and the mass then distributed in the mold by vibration or shaking techniques. Such methods are generally not suitable for aerated confectionery products since the aerated structure tends to break down with vibrations or shaking sufficient to distributed the mass within the mold. If such confectionery mass also contains particulate material, the disruption of the aerated structure is even more severe.

Thus, it would be desirable to provide an effective and practical method to produce aerated confectionery products containing particulate materials. The present invention provides such methods and confectionery products.

SUMMARY OF THE INVENTION

The invention provides an efficient and practical method of producing a aerated confectionery product with particulate materials therein. Such a method is especially adapted for producing aerated chocolate products containing particulate materials therein.

A method for producing an aerated confectionery product, especially an aerated chocolate confectionery produce, is provided. This method comprises (a) depositing a first aerated confectionery mass by allowing it to flow into one or more mold cavities having bottom surfaces in a mold to form a first layer of the first aerated confectionery mass in the one or more mold cavities essentially covering the bottom surfaces, (b) depositing at least one particulate material on the first layer of the first aerated confectionery mass in the one or more mold cavities to create a layer of at least one particulate material on or extending into first layer of the first aerated confectionery mass in the one or mold cavities; and (c) depositing a second aerated confectionery mass by allowing it to flow into the one or mold cavities to form a second layer of the second aerated confectionery mass covering the layer of the at least one particulate material to form the aerated confectionery product, wherein the first and second aerated confectionery masses may be the same or different, wherein the first layer of first aerated confectionery mass can be formed by one or more depositions as in step (a), wherein the second layer of the second aerated confectionery mass can be formed by one or more depositions as in step (c), wherein the layer of at least one particulate material can be formed by one or more depositions as in step (b), and wherein the first and second aerated confectionery masses remain aerated in the aerated confectionery product.

Accordingly, in the novel method of producing a confectionery product at least one confectionery mass is deposited by allowing it to flow into a mold. Thus, the confectionery mass, which is deposited in the novel method, may be described to be flowable. The product pipeline and depositing equipment for confectionery mass may be designed in a certain way for to keep the mass under super-atmospheric pressure. The step of allowing it to flow into a mold can also be described as casting. This substantially avoids the occurrence of shearing forces, which is typical for extrusion methods.

In a second step, particulate material is deposited in and/or on the confectionery mass. In other words, the particulate material is added to the confectionery mass, after a first layer thereof has been deposited. This differs from the previously known methods, as interspersing of the confectionery mass with the particulate material is effected after at least one layer of the confectionery mass has already been deposited. This substantially avoids the deaeration effect which usually occurs when the confectionery mass and the particulate inclusions are mixed before depositing. Experiments have shown that the gas bubbles of an aerated mass can substantially be maintained when the particulate material is deposited in and/or on the first layer of the confectionery mass. Certain quantities of particulate material or inclusions may be positioned onto the deposited layer of confectionery mass to control a specified amount of inclusions in the final product.

In a further step, the depositing of the at least one layer of confectionery mass is repeated. This deposit may completely cover the particulate material. However, it is also possible to allow the particulate material to be exposed and/or protrude from the confectionery product on the side of the first and/or second layer thereof. The second layer of confectionery mass denotes the layer deposited on top of the particulate material.

In the method described herein, the step of depositing a third or more layers of confectionery mass may be conducted by repeating either step (i.e., either before or after the particulate material is deposited) for depositing confectionary mass more than once. Optionally, also the step of depositing a particulate material may be repeated more than once with or without an intermediate deposition of confectionary mass. It should also be mentioned that the step of depositing a first layer of confectionery mass before the particulate material is deposited, may also be repeated, i.e., more than one layer of confectionery mass may be deposited before the particulate material is added. Additionally, the separate depositions of confectionery mass may include the same or different confectionery mass compositions. Likewise, the particulate material added may be a mixture of particulate materials or a single particulate materials; if desired, when using more than one layer of particulate materials, the different layers of particulate material may include the same or different particulate materials.

Experiments have shown that the method described herein essentially avoids deaeration, i.e., a substantial amount of gas bubbles in an aerated confectionery mass may be maintained so that a confectionery product having the desired properties can be produced. Moreover, in the novel method, the step of mixing or blending the confectionery mass with the particulate inclusions may be eliminated. It was shown in an experiment that blending of micro aerated chocolate mass with whole hazelnuts in a conventional blender results in mass de-aeration at 60 to 90% of initial aeration level.

Moreover, with the method described herein, it is possible to produce a confectionery product having a desired weight and/or desired volume. The volume may, for example, be controlled by filling a mold and scraping any superfluous mass from the rim of the mold. As mentioned, the confectionery mass may be aerated, preferably a micro-aerated mass. This type of mass allows the production of confectionery products which have essentially the same visual appearance as non-aerated confectionery products, but with a lower density. In particular, the density may be decreased by approximately 10% versus the density of 'regular", i.e., non-aerated control chocolate mass. Moreover, the aeration level may vary in the range of, for example, 8% to 13%, preferably 9% to 12%. Due to the decreased density, a product having the same mass as a comparative, non-aerated product appears bigger than a comparative non-aerated product. This effect may cause consumers to choose the aerated product. As mentioned, the method described herein allows the production of aerated confectionery products with particulate inclusions in an efficient manner.

Whereas the method described herein can be accomplished with any, preferably aerated, confectionery mass, it is currently preferred to use aerated chocolate mass as the confectionery mass.

The particulate material may be at least one of nuts, raisins, rice crisps, pieces of these particular materials and crumbs of at least one of wafers, cake and biscuits. Mixtures of such particulate materials may also be used. And different particulate materials can be deposited in different layers to achieve unique properties and sensations when consumed.

In a currently preferred embodiment, about 20% to about 40% of the total weight of the confectionery product may be deposited in the first step, i.e., as the first layer of the confectionery mass, about 10% to 30% of the total weight of the confectionery product may be deposited as particulate material and about 40% to about 60% of the total weight of the confectionery product may be deposited as a second layer of confectionery mass. Experiments have been especially successful with a composition of about 30 wt % for the first layer of confectionery mass, about 20 wt % of the particulate inclusions and about 50 wt % of the second layer of confectionery mass.

Moreover, the confectionery mass may be deposited in the shape of a strip having a width in the range of 5 to 500 mm and/or a thickness in the range of 0.5 to 100 mm. The maximum ranges for strip width and thickness relate to blocks of industrial chocolate utilized for further processing. By depositing the confectionery mass as a strip, in contrast to a thick and/or narrow pile, a mold may be substantially filled to the brim with an aerated chocolate mass without the need for shaking or vibrating the mold to distribute the deposited mass. As known from the industry, the piles of aerated chocolate mass expand in molds right after depositing due to the gas expansion at atmospheric conditions, however the extent of gas expansion does not compensate for the pile's uneven shape to produce level bottom of a chocolate bar. In connection with the desired strip shape of the deposited confectionery product, a ratio of width/thickness of above 5 is currently preferred.

It is, moreover, currently preferred to move at least one mold relative to a depositor for depositing the confectionery mass and/or the particulate material. This allows a particularly efficient production of a confectionery product having particulate inclusions, and is implemented at best on continuous motion moulding lines as opposed to intermittent motion moulding lines.

In this context, it is desirable to completely fill the mold in the direction substantially perpendicular to its moving direction, particularly a horizontal direction. Tests showed that this can advantageously be realized when an opening of a discharge outlet is less than 20 mm away from the molds and preferably the clearance between the upper rim of the mold and the discharge outlet is in the range of 2 to 10 mm. Based on the above finding, it was proven to be particularly advantageous when the mold is substantially completely filled with the confectionery mass in a direction perpendicular to the direction of its relative movement. In other words, one or more strips are deposited, for example adjacent to each other, to completely fill the mold in the horizontal direction.

In a machine for accomplishing the method described herein, two depositors for depositing confectionery mass may be provided with a particulate material depositor for depositing particulate material in between (see FIG. 1) the confectionery mass layers. In particular, the use of conventional open depositors for layered depositing of micro aerated chocolate mass results in substandard quality of finished products, as tests have shown. Hence, with the apparatus mentioned above the depositing method described herein provides an improved mode of operation for production of micro aerated chocolate products with particulate materials.

In the method described herein, an apparatus for depositing a confectionery mass, as described below, may be used. The novel apparatus for depositing aerated confectionery mass has at least one discharge passageway extending into at least one discharge outlet. The discharge outlet is essentially a slit, and is formed either at the shaft or inside an elongated nozzle by diverging the discharge passageway in the longitudinal direction of the shaft or the slit. Advantageously, the inner surface of the discharge outlet is situated as close as possible to the product shut-off point at the shaft to minimize the formation of product tails after the shut-off.

It is noted that the length of the discharge outlet may extend substantially perpendicular to a direction in which molds or any other molding means is moved relative to the discharge outlet, hence the confectionery mass can be deposited into the molds in the shape of relatively wide strips.

This differs from the currently known method, in which the aerated confectionery mass is usually deposited as a type of "pile: (usually in the center of the mold) and is shaken or vibrated afterwards to evenly distribute the confectionery mass in the molds. Particularly with aerated chocolate masses this shaking or vibrating has a negative de-aeration effect. In contrast, with the depositor described herein a relatively wide strip of aerated confectionery mass can be deposited in the mold. Consequently, the need for shaking or vibrating is minimized and the extent of de-aeration for aerated confectionery mass may be significantly reduced. Furthermore, a number of discharge outlets can be provided adjacent to each other to deposit a plurality of adjacent strips of confectionery mass. This also allows the mold bottom to be completely covered with confectionery mass in cases when confectionery mass is deposited into one mold from several discharge outlets.

Moreover, tests showed that advantages are provided when the discharge passageway extending either inside the shaft or in the nozzle towards the opening diverges in the longitudinal direction of the discharge outlet. Hence, at the discharge extremity of the passageway one or more openings are provided having an elongate shape with a longitudinal direction extending along their length. The dimension of the discharge passageway along this longitudinal direction is smaller at the inlet end of the discharge passageway either inside the shaft or in the nozzle. In other words, the diverging discharge passageway is either formed in the shaft, or in the nozzle surrounding the shaft. As an alternative, the nozzle having the diverging discharge passageway may be formed so as to allow one or more pistons, manifold depositors or similar devices to deliver the confectionery mass to the nozzle.

From the inlet to the outlet, the discharge passageway diverges in the longitudinal direction of the discharge outlet. This measure has proven to lead to a superior deposition of a confectionery mass in form of wide strips. Whenever required for product quality and/or necessitated by mass flow properties an arcuate cut-off point on the oscillating shaft, as opposed to a straight-line cut-off point, can provide for wide strips of rectangular shape.

As regards the width direction of the discharge outlet, the discharge passageway may also expand in this direction, as seen towards the opening. However, the discharge passageway may also become narrower in the width direction, as seen towards the opening. As regards the cross-sectional area of the discharge passageway, it may increase towards the opening. Generally, in a plan view, the discharge passageway can be described to have the shape of a fishtail. Described three-dimensionally, the passage is a hollow truncated pyramid, with the discharge outlet constituting the base, and the inlet end of the discharge passageway constituting the upper part of the pyramid. At their inlet ends, a plurality of discharge passageways can be in contact with a manifold serving to distribute the confectionery mass to a plurality of passageways. As an alternative, one or more pistons may be provided to supply the confectionery mass to the passageways.

Moreover, with the novel depositor the fat and/or emulsifier content may advantageously be reduced as these ingredients are no longer necessary to ensure a certain mass viscosity which was previously needed to facilitate a uniform distribution of the confectionery mass in the means for molding. For example, the fat content and/or the emulsifier content may be decreased to the extent of more than 10% from control formula. Experiments have shown that advantages in mold coverage may be achieved when at least one discharge passageway diverges substantially symmetrically with respect to a direction towards the discharge outlet, which may substantially correspond to the flow direction of the confectionery mass, particularly with respect to the flow direction from the center of the inlet opening to the center of the outlet opening inside the discharge passageway.

Whereas each discharge passageway may extend to a single discharge outlet, two or even more discharge passageways may extend to a single discharge outlet. In particular, two or more discharge passageways can "merge" at the discharge outlet. This advantageously allows the flowing conditions to be determined by the respective discharge passageway. At the same time, an extremely wide strip of confectionery mass can be deposited through a single, relatively long discharge outlet, to which confectionery mass is supplied by a plurality of discharge passageways.

As regards the width of the discharge outlet, i.e., its dimension perpendicular to the longitudinal direction, experiments showed that a width greater than 0.5 mm and smaller than 3 mm, preferably between about 1 mm and 2.5 mm, ideally about 2 mm, is advantageous for the purpose of depositing aerated chocolate mass. It is assumed that with a width in the described range, compressed gas bubbles within the aerated chocolate mass are not readily ruptured by the confines of the discharge outlet, and advantageous flow conditions can be realized.

It may be advantageous to provide at least one discharge passageway with a surface roughness of less than 6.3 μm. It is expected that such a comparably smooth internal surface of the discharge passageway will aid in preventing gas bubbles from being ruptured by rough inner surface and by confines of product passageway and discharge outlet. In this context, it may, furthermore, be advantageous to provide a complete or substantially complete product passageway, i.e., any passageways, apart from the discharge passageway, through which the product, i.e., the confectionery mass, preferably the aerated chocolate, flows, with the above-mentioned maximum roughness. This will further aid in preventing gas bubbles from being ruptured.

In a machine for producing a confectionery product, having at least one depositor as described above, the mentioned advantages can be obtained. Particularly, in such a machine a vibrator for shaking or vibrating molds to uniformly distribute confectionery mass over the entire mold or any other molding means can be eliminated.

In a preferred embodiment, the machine for producing confectionery products mentioned herein has a conveyor for moving a plurality of molds relative to one or more depositors.

Further details of the apparatus for depositing the confectionery mass, which may be used in the method described herein, may be taken from the application EP 07 014 288, entitled "Apparatus for depositing confectionery mass and method of producing a confectionery product", filed Jul. 20, 2007, by the same Applicant as the present invention. Thus, the disclosure of the mentioned application is incorporated herein by reference.

BRIEF DESCRIPTION OF DRAWING

Hereinafter, the invention will be described by a non-limiting example and with reference to a drawing.

FIG. 1 shows a schematic view of an apparatus for depositing an aerated confectionery mass.

DETAILED DESCRIPTION

The figure shows the outline of an apparatus for depositing an aerated confectionery mass. In this apparatus, the confectionery mass may be stored in a storage tank 10. The confectionery mass is delivered via a pump 12 to a tempering machine 18. Process conditions are monitored by a pressure sensor 14 and a temperature sensor 16. From the tempering machine 18, the confectionery mass is further supplied, via another pump 22, to an aerating system 28. To aerate the confectionery mass, gas is supplied via line 30, and the confectionary mass is blended with gas in a mixing head 32. From the mixing head, the aerated confectionery mass flows, via a pressure valve 36 comprising a pressure sensor 38, and a device 40 for regulating the pressure of the mixing head 32, comprising a pressure sensor 42, to a first manifold 44 comprising one or more depositors for depositing the aerated confectionery mass into molds (not shown) conveyed on a production line 46 (traveling in the direction shown by arrow 46). From the first manifold, the aerated confectionery mass is further supplied, via a pressure valve 48 having a pressure sensor 50 to a second manifold 52, also comprising depositors for depositing the aerated confectionery mass into molds (not shown) riding on the production line 46. Both the first and second manifolds 44 and 52 have deposition fingers 45 for depositing the aerated confectionery mass into the appropriate molds (not shown). Between manifolds 44 and 52, a depositor 74 for depositing particulate material is shown.

Particulate material from storage tank 70 is feed via line 72 to the depositor 74. Additional temperature and pressure senors 62 and 64, respectively, can be included at various locations throughout the process design as desired.

In operation, a first layer of the aerated confectionery mass is deposited into the appropriate mold (not shown) riding on conveyer belt 46 using manifold 44 with deposition fingers 45. The mold (not shown) then passes under particulate material depositor 75 which deposits the particulate material onto the first layer of aerated confectionery mass; the mold (not shown) then passes under manifold 52 with deposition fingers 45 where the second layer of aerated confectionery mass is deposited thereon. Although not shown, there may be additional aerated confectionery mass manifolds 44 and 52 included if additional layers of aerated confectionery mass are to be deposited as well as additional particulate material depositor 45 if additional layers of particulate materials (either different or the same particulate materials) are desired. Moreover, as one skilled in the art would understand, if desired, the same or different aerated confectionary masses could be deposited by manifolds 44 and 52 by making the appropriate process design changes.

As not the entire confectionery mass is deposited through the second manifold 52, a return line 54 is provided, which serves to return a confectionery mass through a further pressure valve 56 comprising a pressure sensor 58, and various static mixers 60 for decrystalling and de-aerating to the storage tank 10.

EXAMPLE

In order to conduct tests and experiments, in connection with the method described herein, three different recipes of known milk chocolate masses of the applicant were prepared. The masses were aerated and deposited into molds related to known products of the applicant through depositors having discharge outlets with a width of about 2 mm, as described above. As described herein, depositing was carried out in a layered manner. During experiments the first layer constituted approximately 30% of the total weight of the chocolate tablet. In connection with the experiment, whole hazelnuts were placed onto the first layer by hand and constituted approximately 20% of the total weight of the tablet. In the described test run, the molds were again put under the apparatus for depositing the aerated chocolate mass and a second layer of chocolate mass, constituting approximately 50% of the total weight of the tablet, was placed onto the first layer and the hazelnuts. During de-molding, i.e., removing the tablets from the molds, no problems were observed. Moreover, some of the samples were examined with regard to their density by water displacement and the density was found to be 9% to 13% lower than that of a control mass. Determining the density by water displacement is conducted by putting the sample into a container, which is filled with water to the brim, and collecting the water which is displaced when the sample is put into the container. Thus, the volume of the product can be measured by determining the volume of water which has been displaced, the weight of the product can be determined by weighing and the density can be calculated.

Moreover, with similar samples, the aeration level has been determined by X-ray tomography. This involves the analysis of a picture made of the cut face of a sample product. In such a picture, the gas bubbles appear significantly lighter than the chocolate. Thus, the picture can be digitalized and analyzed to determine that portion of the cut surface which corresponds to gas bubbles. In this way, it was found that the aeration level is between 8% and 13%, particularly about 12%.

The invention claimed is:

1. A method of producing an aerated confectionery product, said method comprising (a) depositing a first aerated confectionery mass having air bubbles by allowing it to flow from a discharge outlet of a depositor into one or more mold cavities having bottom surfaces in a mold to form a first layer of the first aerated confectionery mass in the one or more mold cavities essentially covering the bottom surfaces, the flow of the first aerated confectionery mass effective to maintain the air bubbles in the first aerated confectionery mass, (b) depositing at least one particulate material on the first layer of the first aerated confectionery mass in the one or more mold cavities to create a layer of at least one particulate material on or extending into first layer of the first aerated confectionery mass in the one or mold cavities; and (c) depositing a second aerated confectionery mass having air bubbles by allowing it to flow from the discharge outlet of the depositor into the one or mold cavities to form a second layer of the second aerated confectionery mass covering the layer of the at least one particulate material to form the aerated confectionery product, the flow of the second aerated confectionery mass effective to maintain the air bubbles in the second aerated confectionery mass, wherein the first and second aerated confectionery masses may be the same or different, wherein the first layer of first aerated confectionery mass can be formed by one or more depositions as in step (a), wherein the second layer of the second aerated confectionery mass can be formed by one or more depositions as in step (c), wherein the layer of at least one particulate material can be formed by one or more depositions as in step (b), wherein the air bubbles of the first and second aerated confectionery masses are maintained in the aerated confectionery product, wherein the depositing of the first and second aerated confectionery masses in steps (a) and (c) is controlled by a shut-off point being located at an inner surface of the discharge outlet for permitting a predetermined amount of the aerated confectionery product to pass through the discharge outlet and being positioned adjacent the discharge outlet for restricting formation of aerated confectionery product tails after shut-off, and wherein the discharge outlet is spaced at a clearance of less than 20 mm from an upper rim of the mold.

2. The method of claim 1, wherein at least one of the first and second aerated confectionery masses are deposited as micro-aerated masses.

3. The method of claim 1, wherein the first and second aerated confectionery masses are aerated chocolate masses.

4. The method of claim 2, wherein the first and second aerated confectionery masses are aerated chocolate masses.

5. The method of claim 3, wherein the particulate material is selected from the group consisting of nuts, raisins, rice crisps, wafers, cake, biscuits, and mixtures thereof, wherein the nuts, raisins, or rice crisps are whole or pieces thereof and the waiters, cake, and biscuits are crumbs or pieces thereof.

6. The method of claim 4, wherein the particulate material is selected from the group consisting of nuts, raisins, rice crisps, wafers, cake, biscuits, and mixtures thereof, wherein the nuts, raisins, or rice crisps are whole or pieces thereof and the waiters, cake, and biscuits are crumbs or pieces thereof.

7. The method of claim 1, wherein the aerated confectionery product contains about 20 to about 40 wt % of the first aerated confectionery mass, about 10 to 30 wt % of the particulate material, and about 40 to 60 wt % of the second aerated confectionery mass.

8. The method of claim 3, wherein the aerated confectionery product contains about 20 to about 40 wt % of the first aerated confectionery mass, about 10 to 30 wt % of the particulate material, and about 40 to 60 wt % of the second aerated confectionery mass.

9. The method of claim 4, wherein the aerated confectionery product contain about 20 to about 40 wt % of the first aerated confectionery mass, about 10 to 30 wt % of the particulate material, and about 40 to 60 wt % of the second aerated confectioner mass.

10. The method of claim 1, wherein at least one or both of the first and second layers are deposited as one or more strips having a width in the range of 5 mm to 500 mm or a thickness in the range of 0.5 to 100 mm.

11. the method of claim at least one or both of the first and second are deposited as one or more strips having a width in the range of 5 mm to 500 mm or a thickness in the range of 0.5 to 100 mm.

12. The method of claim 4, wherein at least one or both of the first and second layers are deposited as one or more strips having a width in the range of 5 mm to 500 mm or a thickness in the range of 0.5 to 100 mm.

13. The method of claim 8, wherein at least one or both of the first and second layers are deposited as one or more strips having a width in the range of 5 mm to 500 mm or a thickness in the range of 0.5 to 100 mm.

14. The method of claim 9, wherein at least one or both of the first and second layers are deposited as one or more strips having a width in the range of 5 mm to 500 mm or a thickness in the range of 0.5 to 100 mm.

15. The method of claim 1, wherein the one or more molds are moved relative to an apparatus for depositing the first aerated confectionery mass, the at least one particulate material, and the second aerated confectionery mass.

16. The method of claim 13, wherein the one or more molds are moved relative to an apparatus for depositing the first aerated confectionery mass, the at least one particulate material, and the second aerated confectionery mass.

17. The method of claim 14, wherein the one or more molds are moved relative to an apparatus for depositing the first aerated confectionery mass, the at least one particulate material, and the second aerated confectionery mass.

18. The method of claim 15, wherein the apparatus has at least one discharge first outlet for depositing the first aerated confectionery mass and at least one discharge second outlet for depositing the second aerated confections and wherein the first and second outlets are spaced at a clearance of less than 20 mm from an upper rim of the mold.

19. The method of claim 16, wherein the apparatus has at least one discharge first outlet for depositing the first aerated confectionery mass and at least one discharge second outlet for depositing the second aerated confections and wherein the first and second outlets are spaced at a clearance of less than 20 mm from an upper rim of the mold.

20. The method of claim 17, wherein the apparatus has at least one discharge first outlet for depositing the first aerated confectionery mass and at least one discharge second outlet for depositing the second aerated confections and wherein the first and second outlets are spaced at a clearance of less than 20 mm from an upper rim of the mold.

21. The method of claim 18, wherein the clearance between the upper rim of the mold and the first and second outlets is 2 mm to 10 mm.

22. The method of claim 19, wherein the clearance between the upper rim of the mold and the first and second outlets is 2 mm to 10 mm.

23. The method of claim 20, wherein the clearance between the upper rim of the mold and the first and second outlets is 2 mm to 10 mm.

24. A method of producing a confectionery product, the method comprising:
  (a) depositing at least one aerated confectionery mass by allowing it to flow into a mold through at least one slit-shaped discharge outlet;
  (b) depositing at least one particulate material in or on the deposited confectionery mass; and
  (c) repeating step (a) at least once,
wherein the method does not include shaking or vibrating the molds to distribute the aerated confectionery mass in the mold, wherein the depositing in steps (a) and (c) is controlled by a shut-off point being located at an inner surface of the discharge outlet for permitting a predetermined amount of the confectionery product to pass through the discharge outlet and being positioned adjacent the discharge outlet for restricting formation of confectionery product tails after shut-off, and wherein the at least one slit-shaped discharge outlet is spaced at a clearance of less than 20 mm from an upper rim of the mold.

25. The method of claim 24, wherein the slit-shaped discharge outlet has a width of 0.5 to 3 mm.

26. A method of producing a confectionery product, the method comprising:
  (a) depositing at least one aerated confectionery mass by allowing it to flow into a mold through at least one slit-shaped discharge outlet such that shearing forces are substantially avoided;
  (b) depositing at least one particulate material in or on the deposited aerated confectionery mass; and
  (c) repeating step (a) at least once to provide the confectionery product,
wherein the method does not include shaking or vibrating the molds to distribute the aerated confectionery mass in the mold, wherein the depositing in steps (a) and (c) is controlled by a shut-off point being located at an inner surface of the discharge outlet for permitting a predetermined amount of the confectionery product to pass through the discharge outlet and being positioned adjacent the discharge outlet for restricting formation of confectionery product tails after shut-off, and the at least one slit-shaped discharge outlet is spaced at a clearance of less than 20 mm from an upper rim of the mold, and wherein the confectionery product has an aeration level of 8 to 13 percent.

* * * * *